(12) United States Patent
Asarisi et al.

(10) Patent No.: US 9,978,349 B2
(45) Date of Patent: May 22, 2018

(54) DRUM ACCESSORY AND DRUMMING METHOD

(71) Applicants: Peter Asarisi, Wantagh, NY (US); Anthony Orchard, Wantagh, NY (US)

(72) Inventors: Peter Asarisi, Wantagh, NY (US); Anthony Orchard, Wantagh, NY (US)

( * ) Notice: Subject to any disclaimer, the term of this patent is extended or adjusted under 35 U.S.C. 154(b) by 0 days. days.

(21) Appl. No.: 15/088,114

(22) Filed: Apr. 1, 2016

(65) Prior Publication Data

US 2016/0335995 A1 Nov. 17, 2016

Related U.S. Application Data

(60) Provisional application No. 62/141,265, filed on Apr. 1, 2015.

(51) Int. Cl.
*G10G 5/00* (2006.01)
*G10D 13/00* (2006.01)
*G10D 13/02* (2006.01)
*F16B 2/22* (2006.01)
*F16M 13/02* (2006.01)
*F16B 2/06* (2006.01)

(52) U.S. Cl.
CPC ......... *G10D 13/003* (2013.01); *G10D 13/026* (2013.01); *G10G 5/00* (2013.01); *F16B 2/065* (2013.01); *F16B 2/22* (2013.01); *F16M 13/022* (2013.01)

(58) Field of Classification Search
CPC .......... G10G 5/00; G10D 13/003; F16B 2/22; F16M 13/022

USPC ....................................................... 84/422.4
See application file for complete search history.

(56) References Cited

U.S. PATENT DOCUMENTS

| | | | | |
|---|---|---|---|---|
| 923,610 A * | 6/1909 | Wanamaker | ......... | B27M 3/0013 269/105 |
| 1,914,652 A * | 6/1933 | Stoer | ...... | G10D 13/02 84/420 |
| 4,651,617 A * | 3/1987 | Schwartz | ............ | G10D 13/003 84/422.4 |
| 4,671,158 A * | 6/1987 | Saputo | ................. | G10D 13/022 84/411 M |
| 4,939,972 A * | 7/1990 | Falberg | .................. | G10D 13/02 24/514 |
| 5,272,952 A * | 12/1993 | Hoshino | ................... | F16B 2/10 24/495 |
| 5,522,300 A * | 6/1996 | Cheatwood | ......... | G10D 13/003 206/314 |
| 5,551,660 A * | 9/1996 | Leduchowski | ........ | F16M 11/10 248/276.1 |
| 5,587,544 A * | 12/1996 | Fujii | ..................... | G10D 13/02 84/411 R |

(Continued)

*Primary Examiner* — David Warren
*Assistant Examiner* — Christina Schreiber
(74) *Attorney, Agent, or Firm* — Wechsler & Wechsler, P.C.; Lawrence I. Wechsler

(57) ABSTRACT

A clamp is attachable to a rim or rim region of a drum, and is suited for resiliently retaining an ancillary drumstick such that a terminal end of the ancillary drumstick is positioned above a skin of the drum, and advantageously spaced apart from the skin by a selected distance, allowing a single drumstick strike to the ancillary drumstick by another drumstick held by the drummer to create multiple hits by the clamped ancillary drumstick in response to a drum strike by the hand-held drum stick.

18 Claims, 10 Drawing Sheets

(56) References Cited

U.S. PATENT DOCUMENTS

| | | | | |
|---|---|---|---|---|
| 6,150,595 A | * | 11/2000 | Vaglica | G10D 13/003 84/327 |
| 6,502,793 B1 | * | 1/2003 | Sargent | G10D 13/02 248/176.1 |
| 7,135,632 B2 | * | 11/2006 | Heselton | G10D 13/003 84/421 |
| 7,163,431 B2 | * | 1/2007 | Walraven | A63H 5/00 446/408 |
| 7,164,074 B1 | * | 1/2007 | Graham | G10D 13/003 84/421 |
| 7,601,903 B1 | * | 10/2009 | Monk | G10D 13/003 84/421 |
| 2006/0174752 A1 | * | 8/2006 | Heselton | G10D 13/003 84/422.4 |
| 2007/0144331 A1 | * | 6/2007 | Briggs | G10D 13/003 84/422.1 |
| 2012/0097011 A1 | * | 4/2012 | Leopold | G10D 13/003 84/422.4 |
| 2012/0279378 A1 | * | 11/2012 | Stamper | G10D 13/003 84/422.4 |
| 2013/0047820 A1 | * | 2/2013 | Chambers | G10D 13/003 84/453 |
| 2014/0060285 A1 | * | 3/2014 | Bradfield | G10D 13/003 84/411 R |
| 2014/0061413 A1 | * | 3/2014 | Bradfield | G10G 5/00 248/229.1 |
| 2016/0335995 A1 | * | 11/2016 | Asarisi | G10D 13/003 |

* cited by examiner

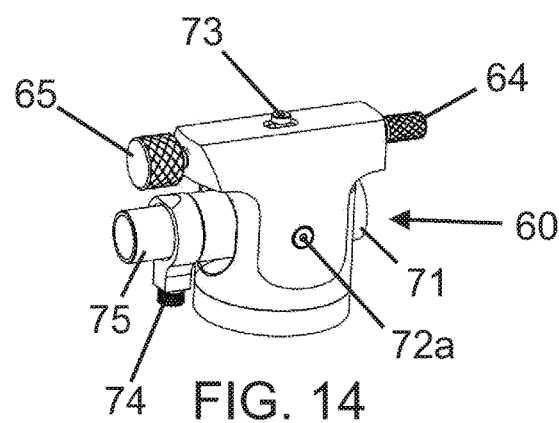
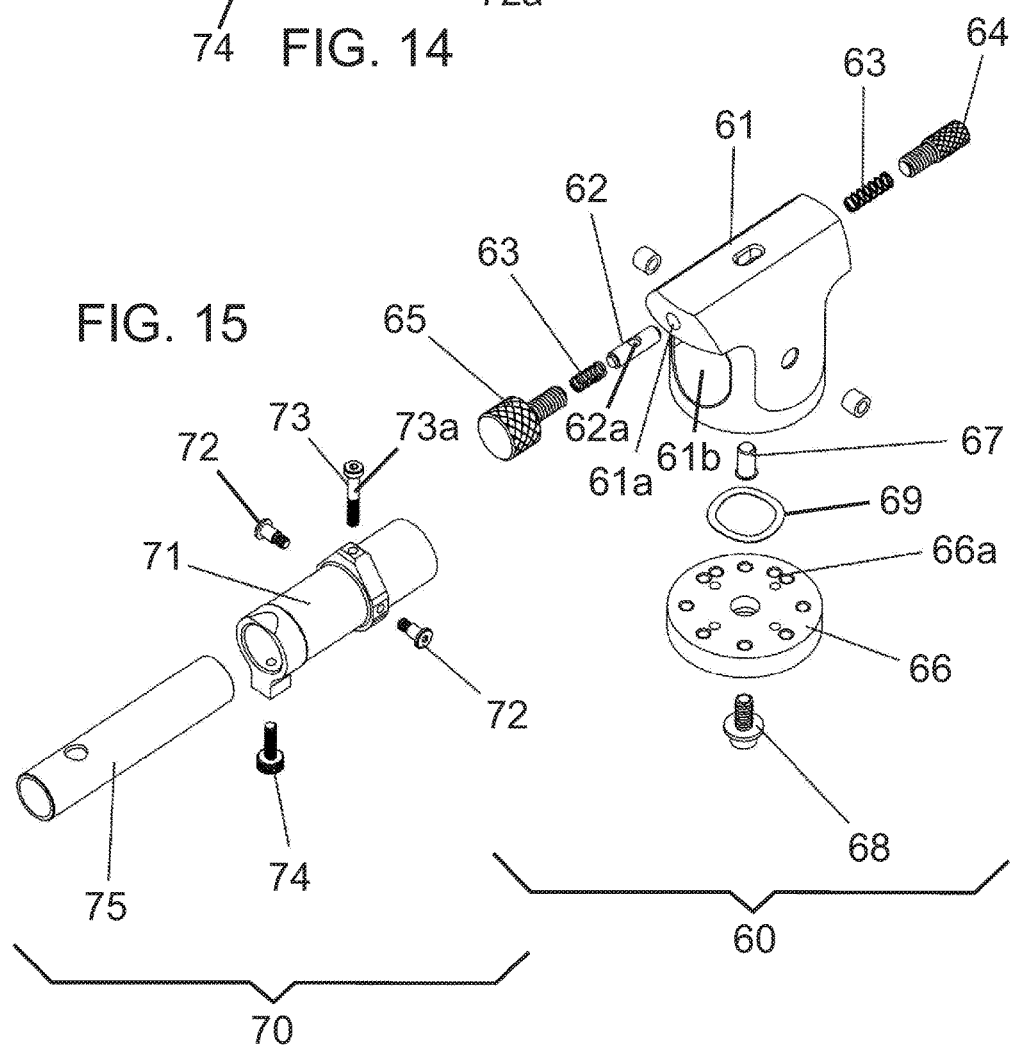

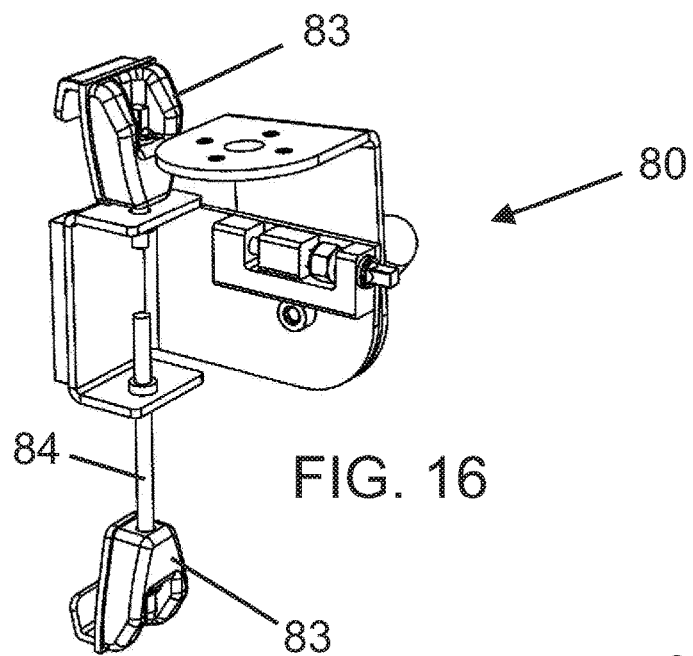
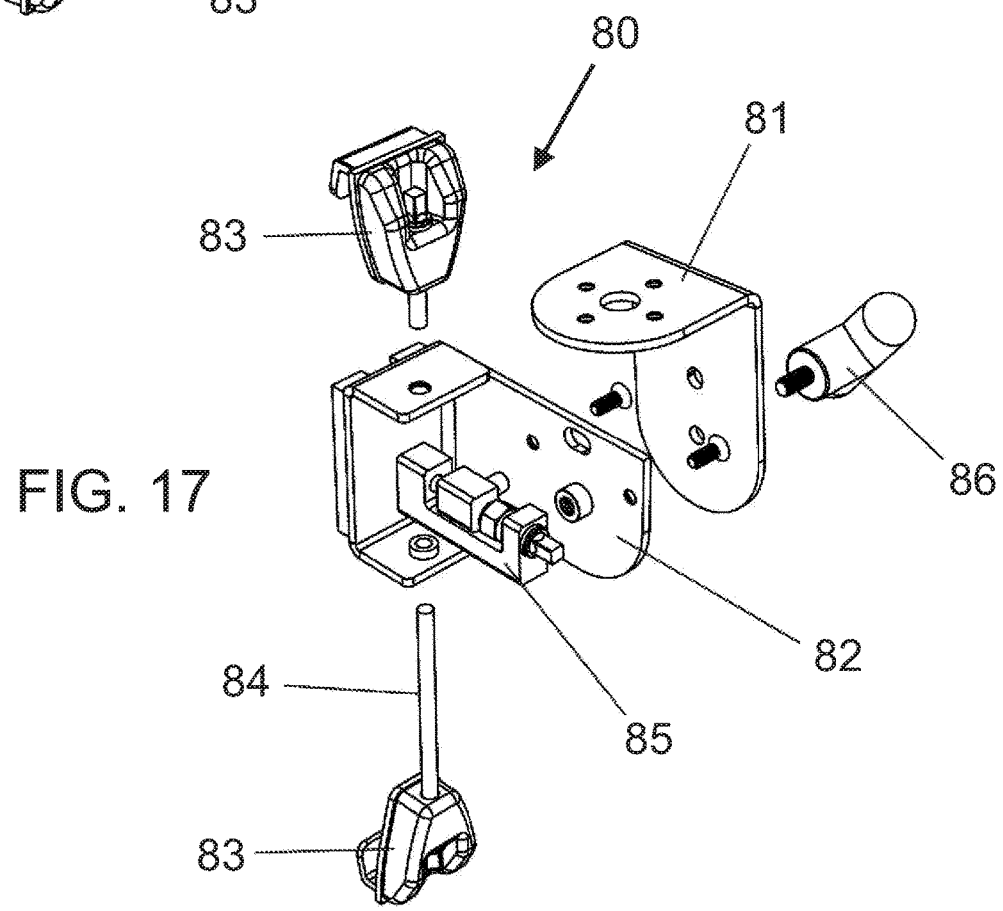

DRUM ACCESSORY AND DRUMMING METHOD

CROSS REFERENCE TO RELATED APPLICATIONS

This application claims the benefit of U.S. Provisional Application No. 62/141,265 filed Apr. 1, 2015 entitled DRUM ACCESSORY AND DRUMMING METHOD.

BACKGROUND OF THE INVENTION

The present invention relates to a drum accessory, and more particularly to an attachment which provides enhanced drumming effects when assembled to a drum.

A drummer typically uses two drumsticks, held in respective hands, to strike a skin of a drum so as to effect a rhythmic beat, generally in concert with a musical performance. However, regardless of the skill level of the drummer, each strike of a given one of the sticks producing a single audible beat.

Guitars and synthesizers are readily adapted to modification of output to augment or vary the sound perceived by the listener. For example, by passing the output of an electric guitar through an electronic effects device, it is possible to add reverberative quality to the output, fuzz, wah-wah or other distortion effects. Similarly, by suitable programming, a synthesizer can, for example, output a chord when only a single note is played. However, with the exception of a snare attachment, which is a wire or the like stretched across a drumhead to produce a rattling sound when the drum is hit with a drumstick, the sound of a drum has heretofore not been significantly varied from the beat produced by the drummer him or herself.

It would therefore be desirable to provide an apparatus which could allow a drummer's playing to be enhanced through mechanical means to provide a wider range and quality of sound of a rhythmic output.

SUMMARY OF THE INVENTION

It is an object of the invention to provide a drum attachment mechanism which would allow a drummer's beat to be acoustically enhanced mechanically for a fuller, more complex, sound, and which is easy to use and relatively economical to produce.

In accordance with these and other objects of the invention, there is provided an apparatus which comprises a clamp or other mounting device which is suitably mountable to a support, advantageously stable, for example, attachable to a rim or rim region of a drum, or a side stand (like a microphone stand), and which is suited for resiliently retaining an ancillary drumstick at a position thereof similar to that typically held in a hand of a drummer, such that a terminal end of the ancillary drumstick is positioned above a skin of the drum, and advantageously spaced apart from the skin by a selected distance, allowing a single drumstick strike to the ancillary drumstick by another drumstick held by the drummer to create multiple hits by the clamped ancillary drumstick in response to a drum strike by the hand-held drum stick.

In accordance with an embodiment of the invention, the clamped ancillary drumstick is resiliently supported and held close to, or in contact with, the surface of the drum skin. Movement of the ancillary drumstick is restricted below by the skin of the drum, and above by a resistive component, conveniently for example, a bumper, carried on the clamping mechanism which restrains the clamped ancillary drumstick. The compression rate of the bumper is optionally adjustable, to allow alteration of a degree of reverberation in response to a drumstick strike by the hand-held drumstick.

When the clamped ancillary drumstick is struck by the handheld drumstick, the clamped ancillary drumstick reverberates multiple times, the number thereof and amplitude produced, depending on the height of the bumper and the force of the strike.

The above, and other objects, features and advantages of the present invention will become apparent from the following description read in conjunction with the accompanying drawings.

BRIEF DESCRIPTION OF THE DRAWINGS

FIG. 14 is a perspective view of the chassis assembly of FIG. 12;

FIG. 15 is an exploded view of the chassis assembly of FIG. 14;

FIG. 16 is perspective view of the mounting bracket assembly of FIG. 12;

FIG. 17 is an exploded view of the mounting bracket assembly of FIG. 16;

DETAILED DESCRIPTION OF THE PREFERRED EMBODIMENT

A method according to the invention comprises supporting an ancillary drumstick with a terminal end thereof in contact with, or in a spaced apart condition from, a drum skin, and striking the ancillary drumstick with a handheld drumstick.

In its most basic embodiment, it is noted that the method according to the invention includes simply resting an ancillary drumstick on a drum rim such that a greater portion of the ancillary drumstick (by weight) extends inward of the rim, such that the terminal end of the ancillary drumstick rests against the drum skin by operation of gravity. A drummer then strikes the ancillary drumstick with a handheld drumstick at a position of the portion of the ancillary drumstick extending inward of the rim, causing a reverberation of the ancillary drumstick after the strike. Positional stability of the ancillary drumstick can be maintained by adjusting successive strikes by position along the ancillary drumstick, and by strike direction and intensity.

Various advantageous embodiments, illustrated by the following structural examples, which are not to be considered as in any way limiting of the intended scope of the invention, serve to physically facilitate implementation of the above operations according to the method or methods of the invention, and are deemed within the contemplated scope of the invention.

Figure 1:
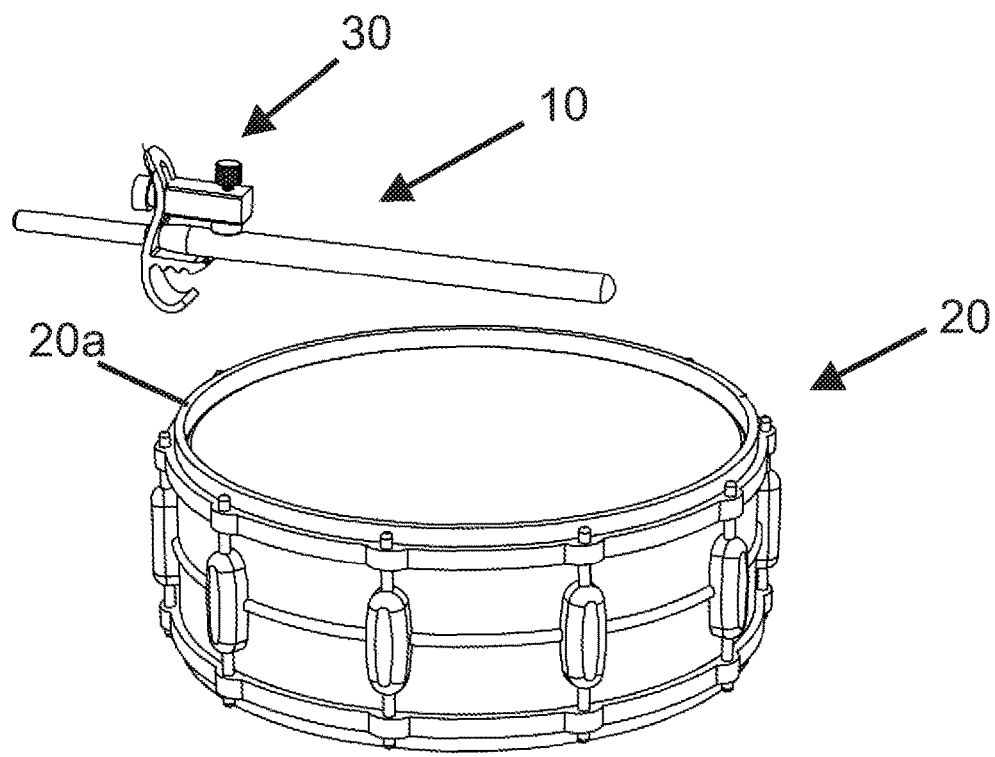
FIG. 1 is an exploded perspective view of a drum accessory, and a drum to which it is to be mounted, according to the invention.
Figure 2:
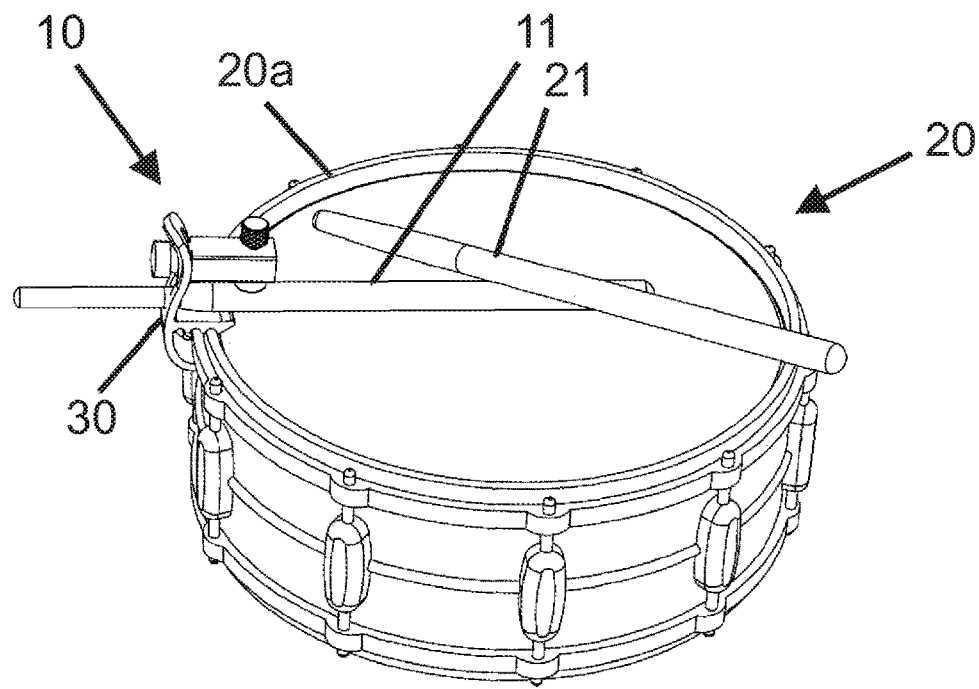
FIG. 2 is a perspective view of the drum accessory of FIG. 1 shown mounted to the drum.
Figure 3:
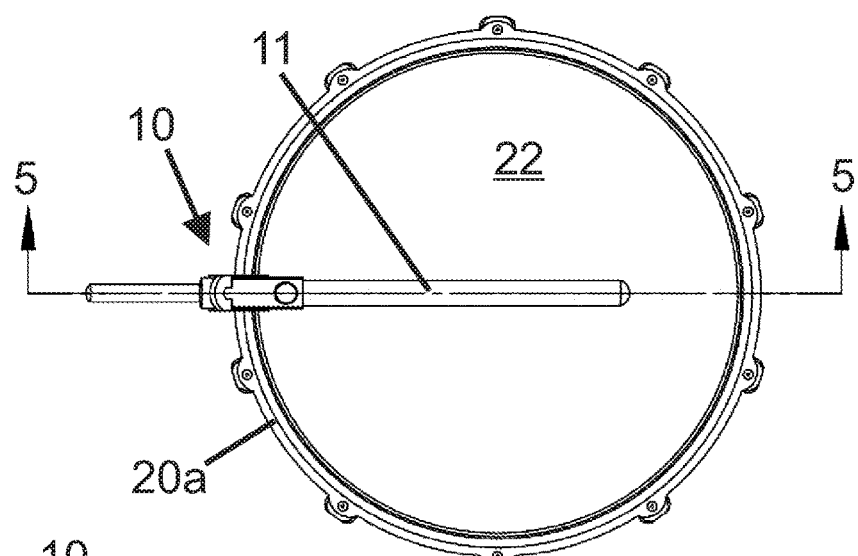
FIG. 3 is top plan view of the drum accessory and drum of FIGS. 1 and 2.
Figure 4:
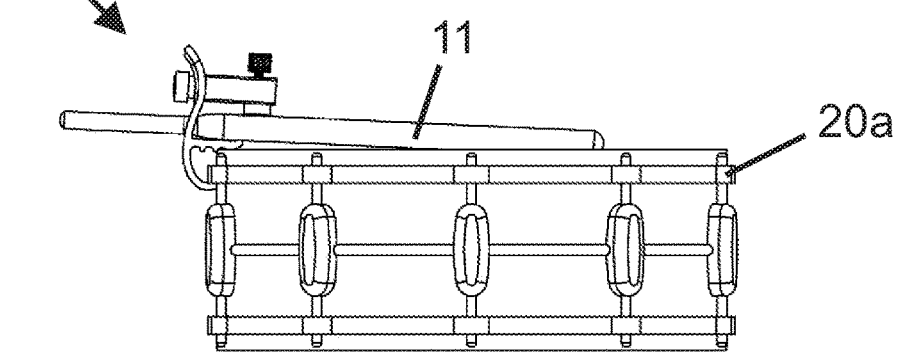
FIG. 4 is a side elevational view of the drum accessory and drum of FIGS. 1 and 2.

Referring now to the figures, and in particular, FIG. 1, an embodiment of a drum accessory according to the invention is depicted generally at 10, shown relative to a drum 20 to which drum accessory 10 is to be mounted. The drum accessory 10 is mountable to drum 20, on or proximate a rim 20a of drum 20.

Figure 5:
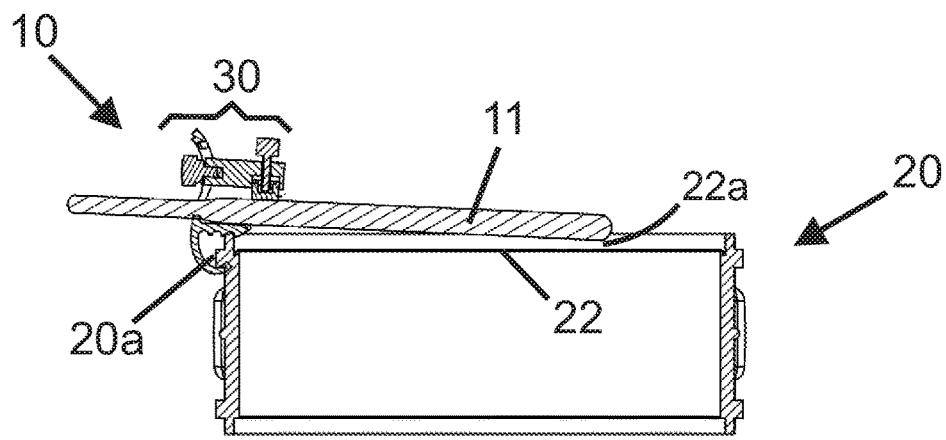
FIG. 5 is a cross-sectional view taken along line 5-5 in FIG. 3.

As shown in FIGS. 1-7, drum accessory 10 includes a mounting device provided conveniently in a form of a clamp assembly 30 structurally configured to receive an ancillary drumstick 11 in a manner providing resilient mounted support thereof As best seen in FIG. 5, a terminal end of ancillary drumstick 11 is advantageously spaced apart a selected distance 22a above a skin 22 of drum 20, such that when struck by a hand-held standard drumstick 21, ancillary drumstick 11 reverberates following the strike, continuing to hit skin 22 one or more times. Standard drumstick 21 which is held in a hand of a drummer, in operation of the drum accessory 10, strikes ancillary drumstick 11 as desired to produce a selected sound effect.

The various elements which comprise clamp assembly 30 are described as follows with reference to FIGS. 6 and 7. Appropriate design of these elements will control how the ancillary drumstick 11 will react when struck by hand-held drumstick 21.

Figure 6:
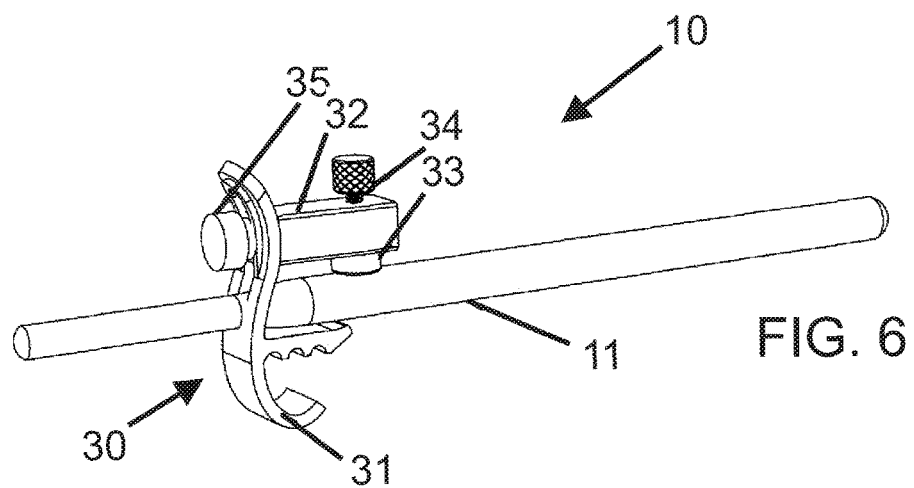
FIG. 6 is a perspective view of the drum accessory of FIGS. 1 and 2 shown alone.
Figure 7:
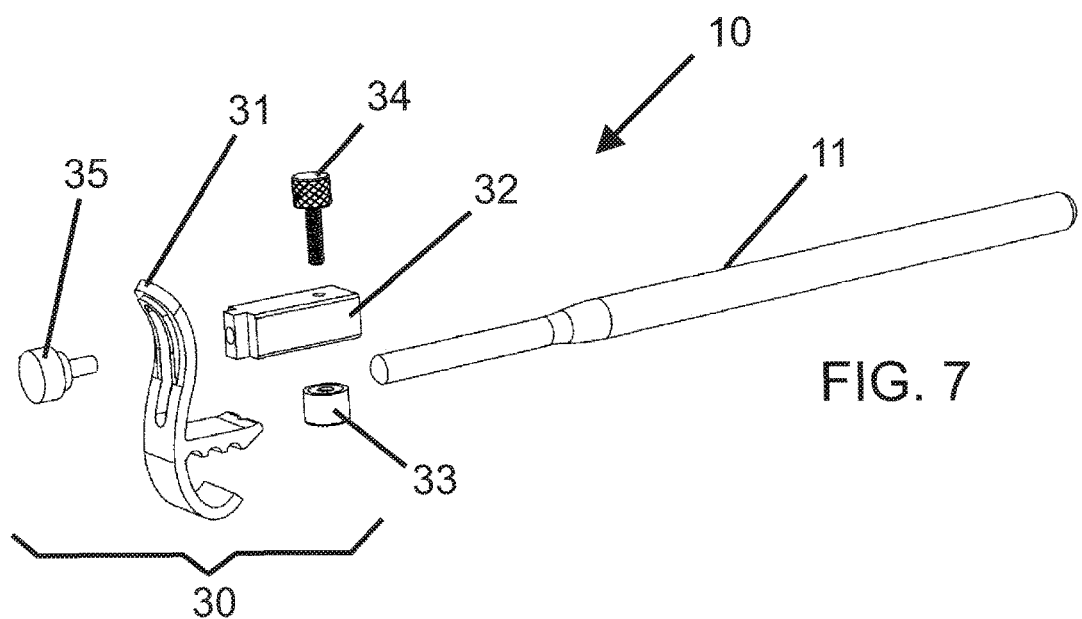
FIG. 7 is an exploded perspective view of the drum accessory of FIG. 6.
Figure 8:
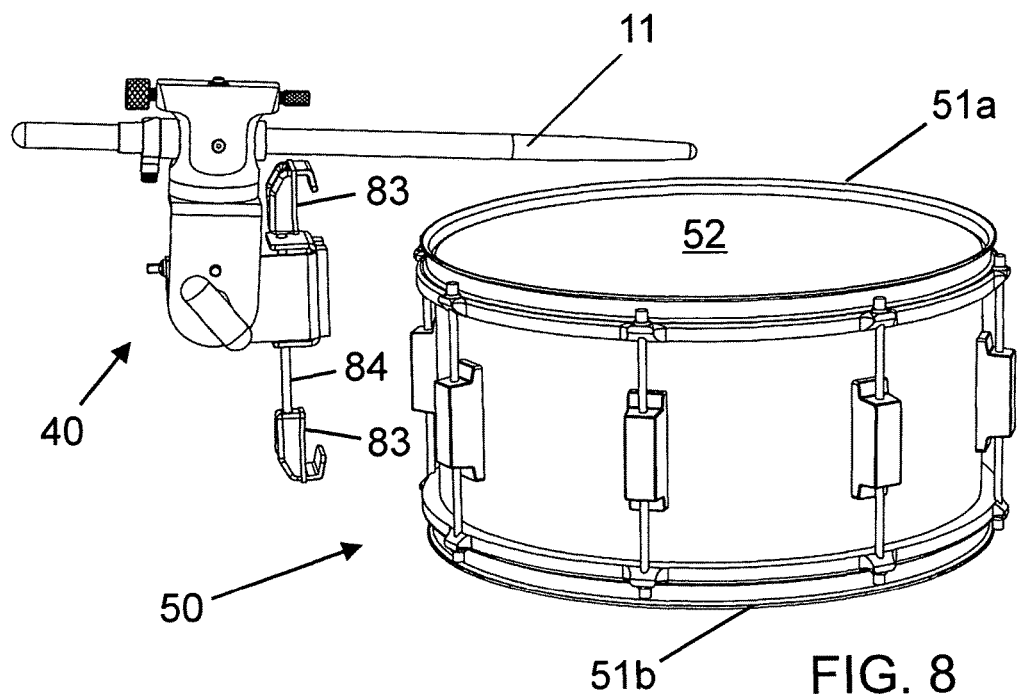
FIG. 8 is an exploded perspective view of a drum accessory, and a drum to which it is to be mounted, according to an alternative embodiment of the invention.

As shown in each of FIGS. 6 and 7, clamp assembly 30 includes a clamp support 31, a counterweight 32, a bumper 33, an optional bumper adjustment mechanism 34 and a counterweight fastener 35. Clamp support 31 is comprised of a resilient material, for example rubber or other suitable elastomer of selected durometer. An example of such clamp structure is currently used for mounting drum microphones, and is available as the clamp used in a Sennheiser e604 compact dynamic microphone optimized for snare drums and toms. (See website: sennheiser.com). Counterweight 32 is held to clamp support 31 by counterweight fastener 35 which conveniently threadably engages counterweight 32 across a slotted portion of clamp support 31.

As mentioned above, when the clamped ancillary drumstick 11 is struck by the handheld drumstick 21, the clamped ancillary drumstick 11 reverberates, striking drum skin 22 on or more additional times. The number of reverberating strikes on drum skin 22 and amplitude produced, will depend on the height of bumper 33 and the force of the strike. To allow selective adjustment of the height of bumper 33, optionally, a bumper adjustment mechanism is provided, conveniently comprising, for example, a turn screw 34 threaded through counterweight 32.

An alternative embodiment is now described with reference to FIGS. 8-20.

Figure 9:
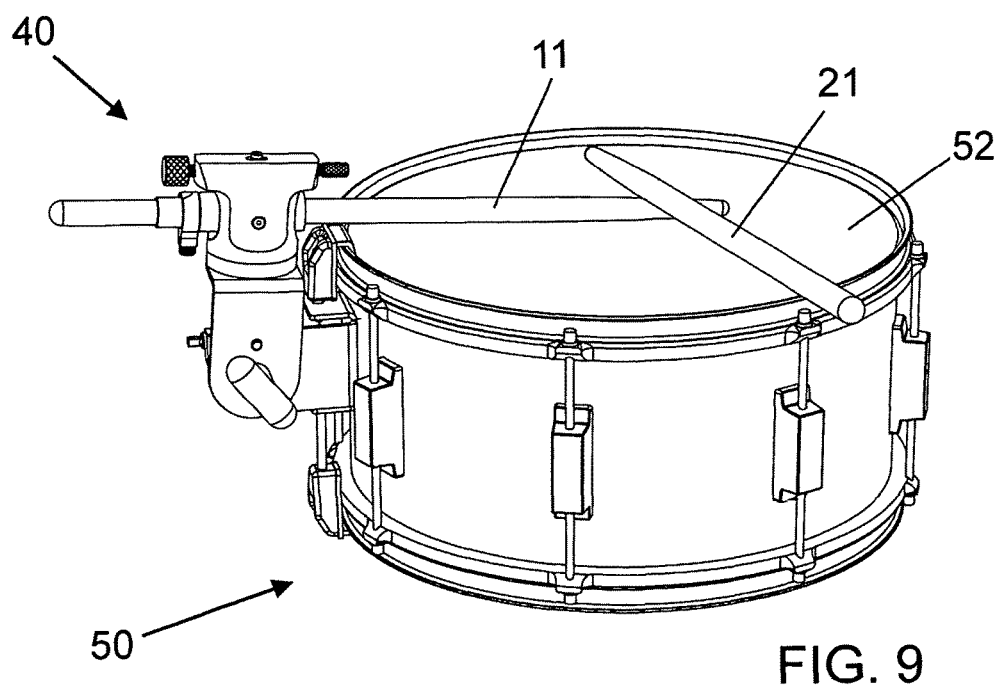
FIG. 9 is a perspective view of the drum accessory of FIG. 8 shown mounted to the drum.
Figure 10:
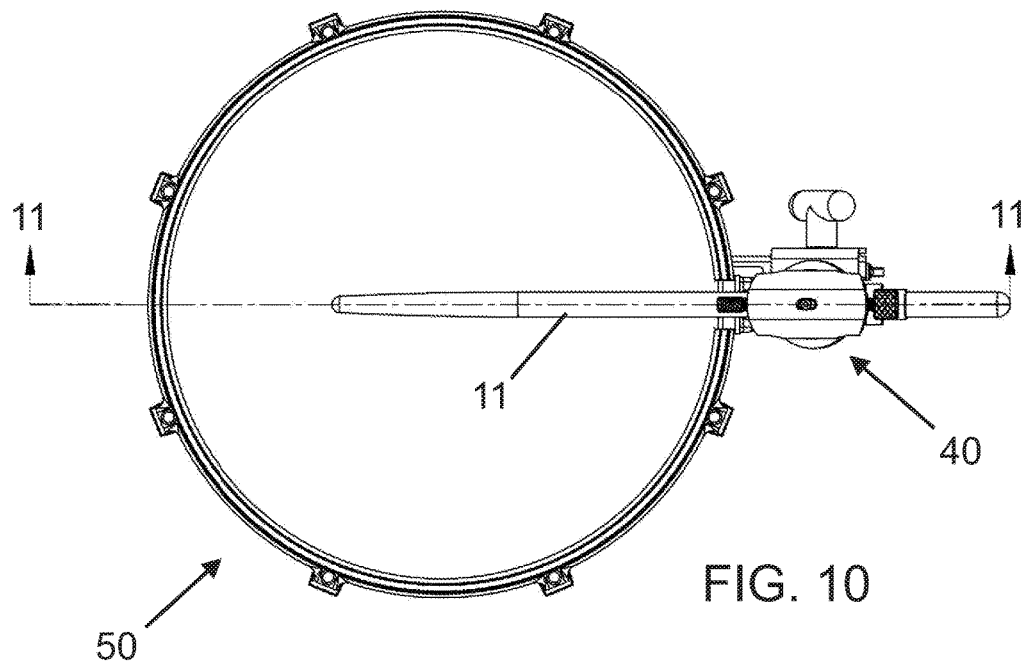
FIG. 10 is top plan view of the drum accessory and drum of FIGS. 8 and 9.

Referring now to the figures, and in particular, FIG. 9, the alternative embodiment of a drum accessory according to the invention is depicted generally at 40, shown relative to a drum 50 to which drum accessory 40 is to be mounted. The drum accessory 40 is mountable to drum 50, on or proximate one or more rims 51a (upper), 51b (lower) of drum 50, for example, by a pair of clamps 83 (see FIG. 8, prior to mounting).

Figure 11:
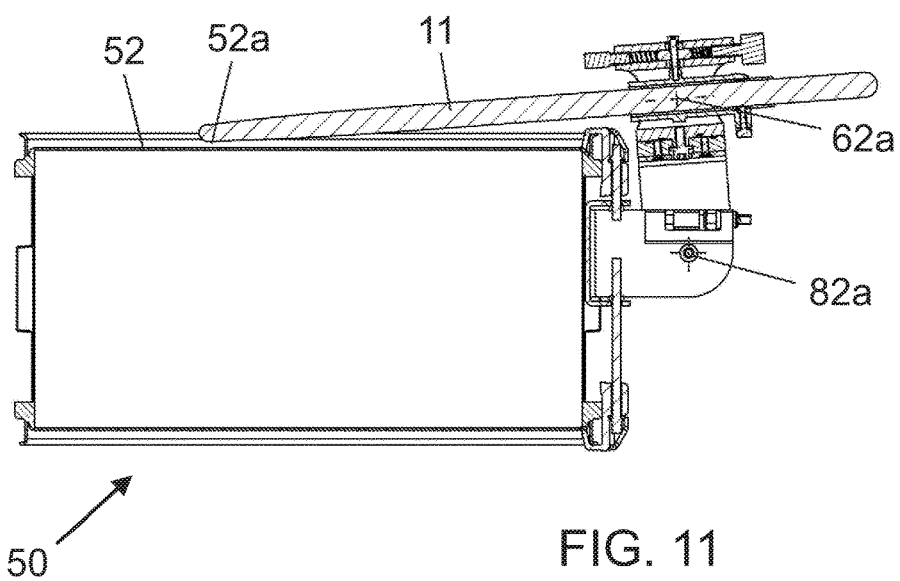
FIG. 11 is a cross-sectional view taken along line 11-11 in FIG. 10.
Figure 12:
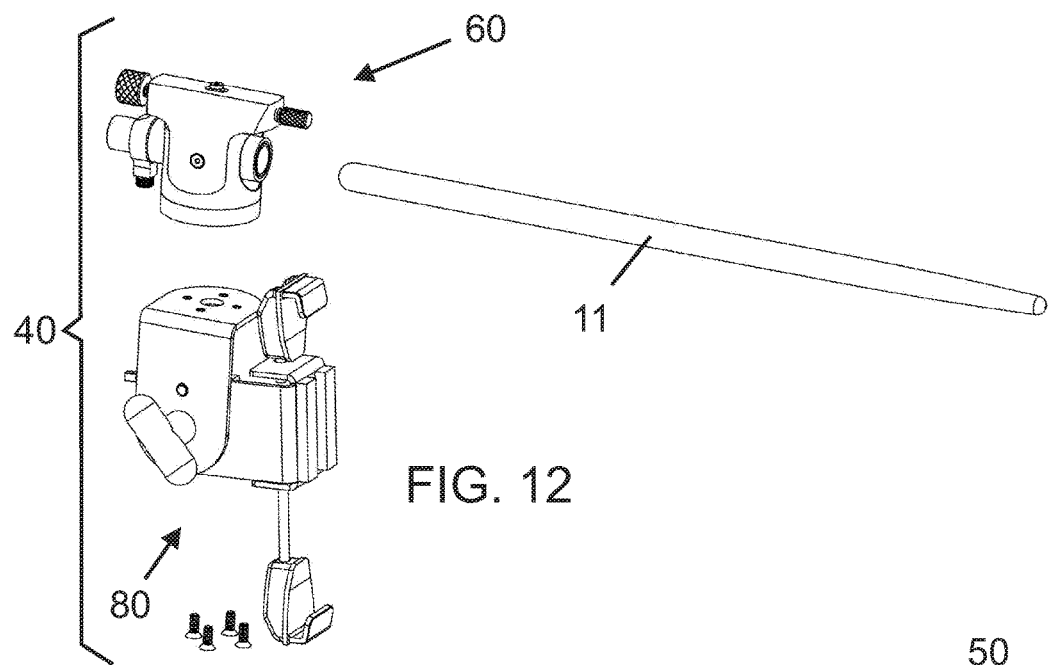
FIG. 12 is an exploded perspective view of the drum accessory of FIG. 8.

As best seen in FIG. 12 drum accessory 40 includes chassis assembly 60 which, like the clamp assembly 30 of the first embodiment described above, is structurally configured to receive an ancillary drumstick 11 in a manner providing resilient mounted support thereof. As best seen in FIG. 11, a terminal end of ancillary drumstick 11 is advantageously spaced apart a selected distance 52a above a skin 52 of drum 50, such that when struck by a hand-held drumstick 21, ancillary drumstick 11 reverberates following the strike, continuing to hit skin 52 one or more times in addition to an initial strike.

Standard drumstick 21, which is held in a hand of a drummer in operation of the drum accessory 40, is caused to strike ancillary drumstick 11 as desired to produce a selected sound effect.

The various elements which comprise drum accessory 40 are described as follows, with reference to FIGS. 12-17. As with the previously described embodiment, appropriate design and/or selection of these elements will control precisely how the ancillary drumstick 11 will react when struck by hand-held drumstick 21.

Figure 13:
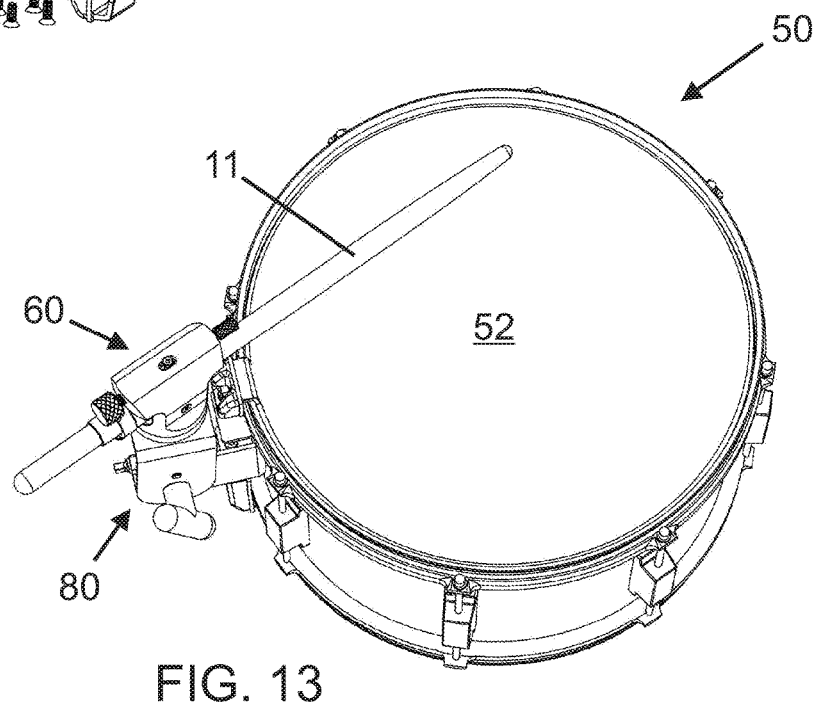
FIG. 13 is a perspective view of the drum accessory of FIGS. 8-12 shown mounted to the drum, with ancillary drumstick rotated.
Figure 18:
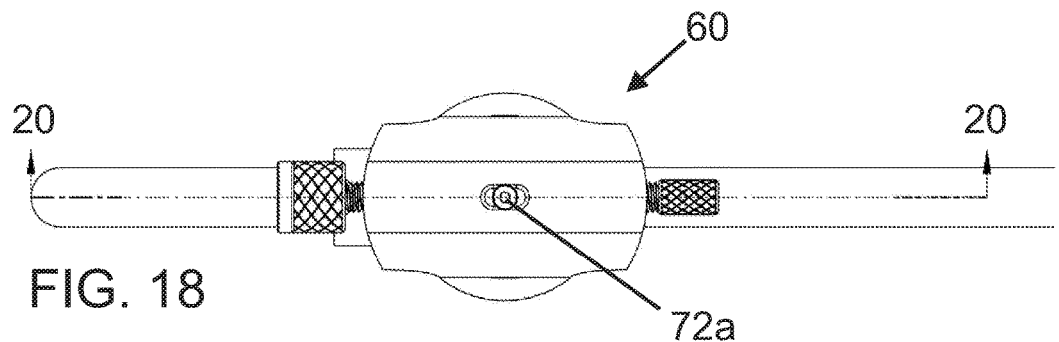
FIG. 18 is a plan view of the chassis assembly of FIG. 12.
Figure 19:
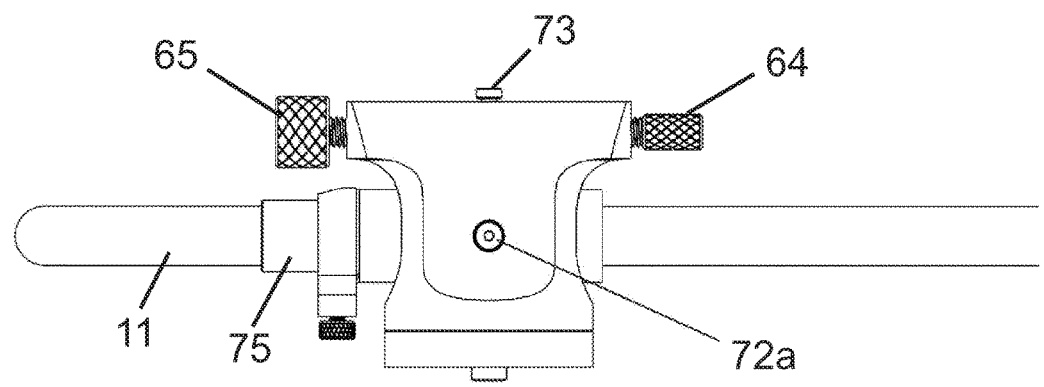
FIG. 19 is an side view of the chassis assembly of FIG. 18.

As shown in FIG. 12, drum accessory 40 comprises a chassis assembly 60 (which supports a drumstick clamp 70, see FIG. 15) and a mounting device 80. Chassis assembly 60 is rotatably received to mounting device 80, which is in turn mounted to drum 50, so as to allow pivotable angling of the chassis assembly 60 relative to the drum 50, to thereby allow desired positioning of an end of ancillary drumstick 11 over a particular region of the drum skin, as shown in FIG. 13 (shown moved off-center of the drum skin 52).

As shown in FIGS. 14 and 15, drumstick clamp 70 is comprised of a clamp cylinder 71 and a locking screw 74, operable to retain ancillary drumstick 11 when tightened. An optional sleeve 75 may be used inside clamp cylinder 71 to allow thinner drumsticks to be stably and securely accommodated.

Chassis assembly 60 is comprised of a chassis block 61 and a chassis base 66 rotatably attached thereto conveniently via an axial pin 68. Chassis block 61 includes a bore 61b for accommodating drumstick clamp 70 therethrough. Chassis assembly 60 further includes a shuttle 62 which slides inside a cylindrical channel 61a through the chassis block 61. Springs 63 are disposed at each end of the shuttle 62 for biasing shuttle 62 in opposed directions, creating resiliency in both directions which are operative to urge the shuttle 62 to a position of dynamic equilibrium at which the forces exerted by both springs 63 are balanced, creating an oscillatory effect in response to a disturbance of the equilibrium created when the ancillary drumstick is struck, as described more fully below. Thumbscrews 64 and 65 are advantageously provided to allow optional adjustment of a degree of compression of each of the springs 63.

Figure 20:
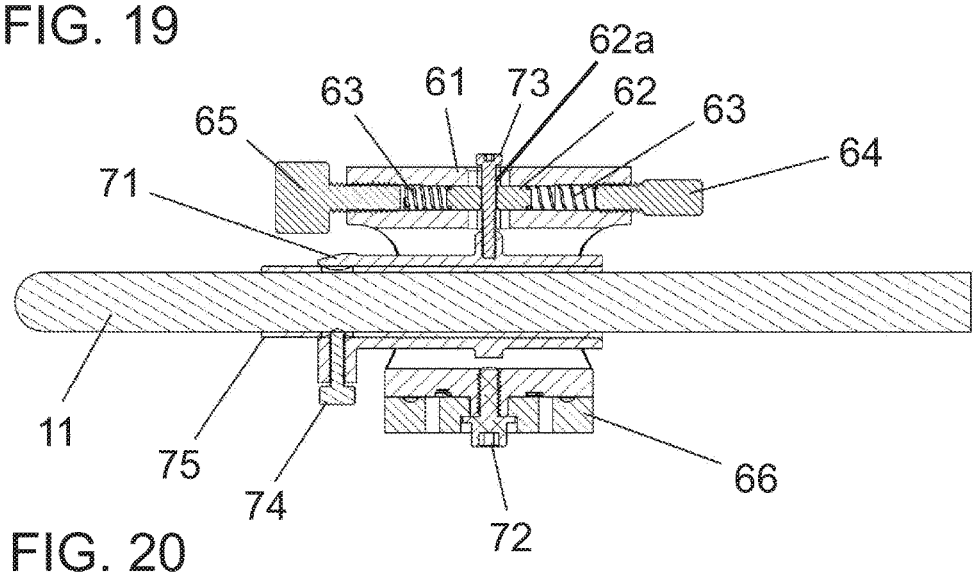
FIG. 20 is a cross-sectional view taken along the line 20-20 of FIG. 18.

Drumstick clamp 70 is pivotably mounted about a drumstick clamp axis 72a within chassis block 61, conveniently by use of mounting pins 72 on each side of drumstick clamp 70. As best seen in FIG. 20, a vertical pin 73 mounted to clamp cylinder 71 advantageously by a threaded end includes a shaft portion 73a which is slidably received through a reception hole 62a in shuttle 62, functioning to transfer the resiliently biased linear movement of shuttle 62 to the pivotal movement of clamp cylinder 71 and, in turn, ancillary drumstick 11 held thereby, creating pivotal oscillation of ancillary drumstick about drumstick clamp axis 72a. Advantageously, as shown, a top portion of vertical pin 73 is exposed to the outside of chassis block 61 through an elongated slot (which delimits rocking movement) to allow access thereto for facilitated replacement of vertical pin 73 if damaged or bent during play.

As described above, and as best seen in FIG. 15, chassis base 66 is rotatably attached to the chassis block 61 conveniently by axial pin 68, allowing drumstick clamp 70 to be rotated away from the center of the drum 50 as desired, as shown in FIG. 13. Optionally, detents 66a are provided in the top of chassis base 66 which are cooperative with a ball nose spring plunger 67 mounted to the underside of chassis block 61 (in a position offset from a center thereof corresponding radially with positioning of detents 66a)), allowing the alternative horizontal angles of the ancillary drumstick 11 relative to the drum to be set in predetermined increments. An optional wave washer 69 provides pressure between chassis block 61 and chassis base 66 to limit unwanted horizontal movement.

As shown in FIGS. 16 and 17, mounting device 80 is comprised of a top support plate 81 holding the chassis assembly 60, a hinged mount plate 82 holding the above components to the drum 50 by the pair of clamps 83 which engage, respectively, upper rim 51a and lower rim 51b of drum 50 (as shown, for example, in FIGS. 8, 9 and 11), and an optional angle adjust mechanism 85. A rod 84 passes through a lower portion of hinged mount plate 82 and extends therefrom to connect with a lower one of clamps 83 (see FIG. 16). Mechanism 85 allows fine adjustments to be made to the angle of the top support plate 81 which is rotatable about a mount plate axis 82a see FIG. 11), and thereby the height 52a of ancillary drumstick 11 above drum skin 52. Locking knob 86 locks the selected angle in place.

As mentioned above, when the clamped ancillary drumstick 11 is struck by the handheld drumstick 21, the clamped ancillary drumstick 11 reverberates, striking drum skin 52 one or multiple additional times. The number of reverberating strikes on drum skin 52 and amplitude produced, will depend on the height of ancillary drumstick 11, the degree of compression of springs 63 and the force of the strike. As noted above, selective adjustment of the height of ancillary drumstick 11 is achieved conveniently by adjusting the angle of the top support plate 81. Rotation of thumbscrews 64, 65 to compress or relax the shuttle springs 63 allows selective adjustment of the resistance of the ancillary drumstick 11 by increasing the opposing bias. This approach optimizes the ability to adjust every aspect of the height and resistance of the ancillary drumstick 11.

Figure 21:
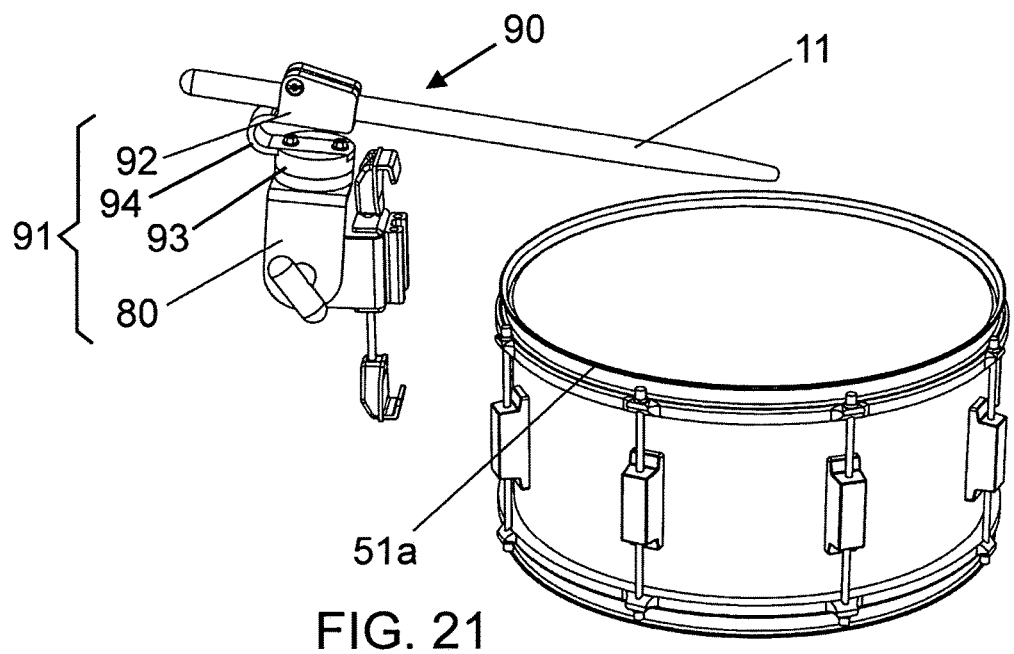
FIG. 21 is an exploded view of a second alternative embodiment of a drum accessory according to the invention.
Figure 22:
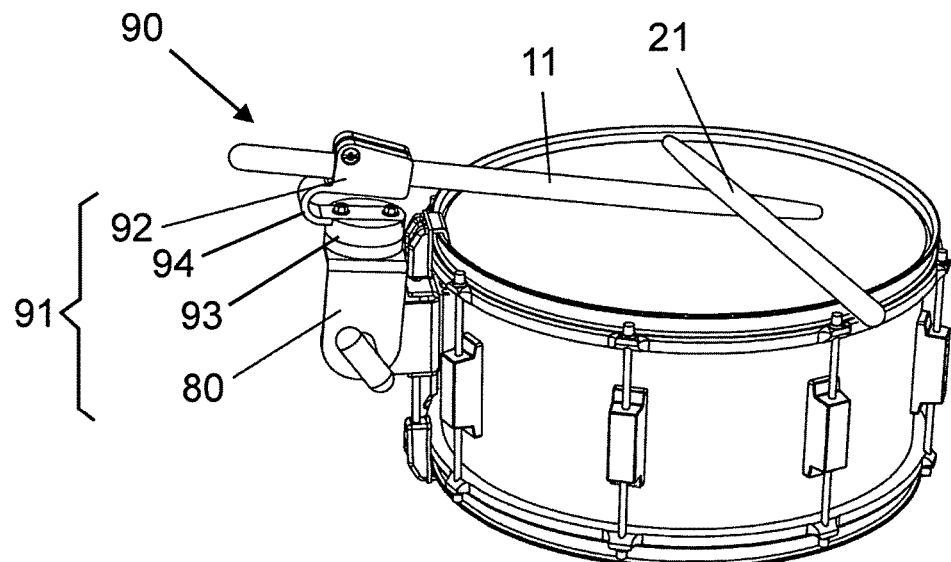
FIG. 22 is a perspective view of drum accessory of FIG. 21 shown mounted to the drum.

An alternative simplified embodiment of a drum accessory according to the invention is depicted in FIGS. 21 and 22, generally designated 90. Drum accessory 90 comprises an elastomeric chassis 91 configured to hold ancillary drumstick 11 in a drumstick clamp portion 92 joined to a chassis base portion 93 by a resilient connection conveniently as a curved spring portion 94, as shown in the example, allowing ancillary drumstick 11 to reverberate when struck. Elastomeric chassis 91 is mounted to drum 50 in any convenient manner, for example, in the depicted example, by use of mounting device 80 of the previous embodiment, which advantageously provides the ability to adjust height of ancillary drumstick 11 above drum skin 52, as described above.

The various components of the drum accessory according to the invention can be fabricated, molded or produced by any suitable means from a variety of materials as guided by particular design, as selection thereof is not deemed critical to the invention. For example, the chassis block and base of the embodiment of FIGS. 8-20 can be fashioned from aluminum or Delrin, and the various plates of the mounting device can be bent steel or aluminum.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention.

What is claimed is:

1. A drum accessory, comprising:
   a supporting structure mountable to a support, said supporting structure being configured for receiving an ancillary drumstick, and for providing resilient support for said ancillary drumstick in such manner as to position a terminal end of said ancillary drumstick in contact with, or spaced above, a drum skin when in a resting position, said resilient support of said supporting structure being operable to allow said terminal end to move to a spaced apart condition above the drum skin following contact of said terminal end with said drum skin and to cause the terminal end to re-strike the drum skin at least one additional time from said spaced apart condition.

2. A drum accessory according to claim 1, wherein said support is a portion of a drum.

3. A drum accessory according to claim 1, wherein said supporting structure comprises:
   a chassis assembly configured to support the ancillary drumstick; and
   a mounting device on which the chassis assembly is received which includes a structural configuration operable for mounting of the drum accessory to a drum.

4. A drum accessory according to claim 3, wherein said chassis assembly is rotatably received to the mounting device.

5. A drum accessory according to claim 3, wherein a drumstick clamp is received to said chassis assembly, said drumstick clamp being operable to retain said ancillary drumstick.

6. A drum accessory according to claim 5, wherein said drumstick clamp is comprised of a clamp cylinder and a locking screw for adjustably securing drumsticks of varying diameters.

7. A drum accessory according to claim 1, wherein said supporting structure includes a clamp support configured to hold said ancillary drumstick and which is comprised of a resilient material, said clamp support being attachable to a drum for resiliently supporting said ancillary drumstick.

8. A drum accessory according to claim 1, wherein said supporting structure includes a mechanism allowing adjustment of a vertical position of the terminal end relative to said drum skin.

9. A drum accessory, comprising:
   a supporting structure mountable to a support, said supporting structure being configured for receiving an ancillary drumstick, and for resiliently supporting said ancillary drumstick in such manner as to position a terminal end of said ancillary drumstick in contact with, or spaced above, a drum skin, said supporting structure including a chassis assembly configured to support the ancillary drumstick, and a mounting device on which the chassis assembly is received which includes a structural configuration operable for mounting of the drum accessory to a drum, said chassis assembly comprising:
a chassis block;
a shuttle slidably received within said chassis block for movement codirectional with a longitudinal extent of said ancillary drumstick when held by said chassis assembly;
springs which bias the shuttle in opposed directions of slidable movement thereof; and
a coupling which converts pivotal movement of said ancillary drumstick into linear displacement of said shuttle.

10. A drum accessory according to claim 9, further comprising a chassis base receivable to said mounting device, said chassis head being rotatably receivable to said chassis base allowing generally horizontal rotation of said chassis block and said ancillary drumstick when receivably supported thereby.

11. A method of augmenting a drum beat created by a strike by at least one hand-held drumstick; comprising:
positioning an ancillary drumstick such that a terminal end thereof is in contact with, or a spaced apart condition from, a drum skin; and
striking the ancillary drumstick with the at least one handheld drumstick on a portion of said ancillary drumstick which is located over the drum skin, inward of a rim of the drum, to cause said ancillary drumstick to initially strike the drum skin, to subsequently lift off of the drum skin, and then to subsequently strike the drum skin at least one additional time without requiring an additional strike by said at least one handheld drumstick.

12. A method according to claim 11, wherein said positioning includes mounting said ancillary drumstick to a support in a manner in which pivoting movement of said ancillary drumstick is resiliently biased in both rotational directions.

13. A method according to claim 12, wherein said support includes a portion of a drum.

14. A method according to claim 12, further comprising selectively adjusting a vertical position of the terminal end relative to said drum skin.

15. A method of supplying a drum accessory for use in enhancing a drum performance, comprising:
providing a supporting structure mountable to a support, said supporting structure being configured for receiving an ancillary drumstick, and for providing resilient support for said ancillary drumstick in such manner as to position a terminal end of said ancillary drumstick in contact with, or spaced above, a drum skin when in a resting position, said resilient support of said supporting structure being operable to allow said terminal end to move to a spaced apart condition above the drum skin following contact of said terminal end with said drum skin and to cause the terminal end to re-strike the drum skin at least one additional time from said spaced apart condition; and
marketing said supporting structure as a device for enhancing the drum performance.

16. A method according to claim 15, wherein said support is a portion of a drum.

17. A method according to claim 15, wherein said supporting structure comprises:
a chassis assembly configured to support the ancillary drumstick; and
a mounting device on which the chassis assembly is received which includes a structural configuration operable for mounting of the drum accessory to a drum.

18. A method of augmenting a drum beat created by a strike by at least one hand-held drumstick; comprising:
positioning an ancillary drumstick such that a terminal end thereof is in contact with, or a spaced apart condition from, a drum skin;
resiliently coupling the ancillary drumstick to the drum; and
striking the ancillary drumstick with the at least one handheld drumstick.

* * * * *